Patented Feb. 24, 1942

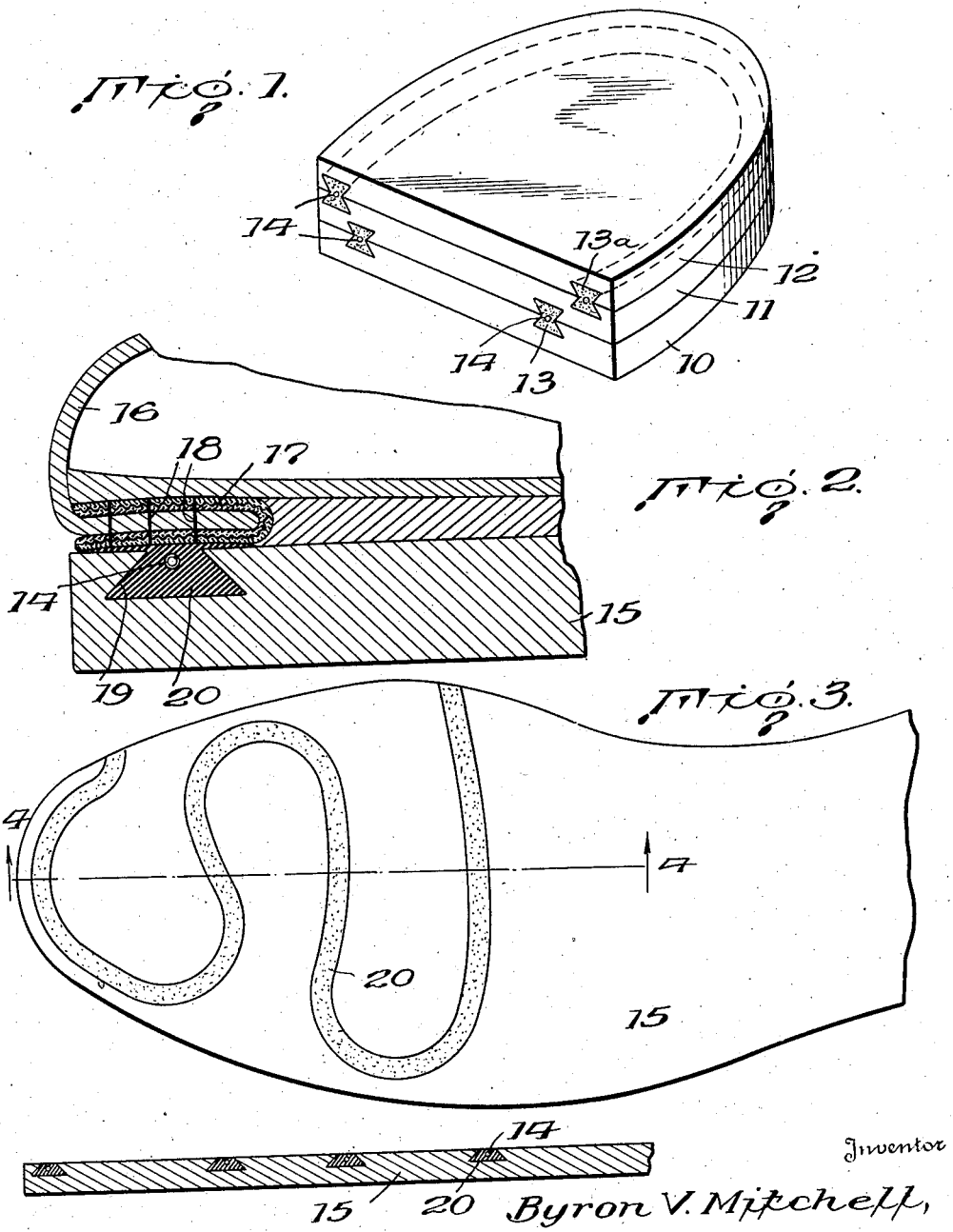

2,273,976

UNITED STATES PATENT OFFICE 2,273,976

VULCANIZED RUBBER JOINT

Byron V. Mitchell, Jamaica, N. Y.

Application August 12, 1939, Serial No. 289,851

2 Claims. (Cl. 12—142)

This invention relates to vulcanized rubber joints and method of forming the same.

The primary object of the invention is to form or produce a vulcanized rubber joint wherein the rubber is vulcanized, in situ, by the application of heat interiorly of the body of rubber.

A further object of the invention is to provide a vulcanized rubber joint wherein the rubber constituting the joint is mechanically interlocked with the body in which the joint is formed.

A still further object is to provide a vulcanized rubber joint especially adapted for use in connection with leather articles in that the heat which is applied to the rubber during the vulcanizing step may be accurately controlled so as not to have any detrimental effect on the leather.

A still further object of the invention is to provide a vulcanized rubber joint for securing the sole of a shoe to the upper of the shoe.

Still another object is to provide a vulcanized rubber joint between the sole of a shoe and the upper of the shoe to form a water-tight joint or seam connecting the sole and upper.

A still further object of the invention is to provide a shoe sole with a length of rubber exposed at one surface thereof, the rubber being embedded in the sole and vulcanized, in situ, as well as being mechanically interlocked.

More specifically, the invention contemplates a method of joining a length of rubber in a body, particularly a shoe sole, by embedding a length of raw rubber in the shoe sole with a heating element, for instance, an electrical conductor of high electrical resistivity embedded in the rubber, whereby heat for vulcanizing the raw rubber is applied thereto internally and, by accurately controlling the heat, all danger of damaging the adjacent leather is eliminated. In the preferred method, the raw rubber is placed in a channel formed in the leather sole, the side walls of the channel being undercut so that, in cross-section, the rubber will be dove-tailed into the leather to thus form a mechanical interlock between the rubber and leather.

With these and other objects in view, the invention consists in certain details of construction and combinations and arrangements of parts, all as will hereinafter be more fully described, and the novel features thereof particularly pointed out in the appended claims.

In the accompanying drawing—

Figure 1 is a perspective view illustrating the heel of a shoe having the rubber sole secured to the leather portion of the heel by vulcanized rubber strips which are interlocked with the individual sections of the heel;

Fig. 2 is a sectional view taken transversely of the toe portion of a shoe illustrating a vulcanized rubber joint for securing the sole to the upper;

Fig. 3 is a bottom plan view of a shoe sole having a strip of vulcanized rubber joined thereto by being embedded therein, although being exposed at the tread surface of the sole; and Fig. 4 is a sectional view on the line 4—4 of Fig. 3.

Due to the fact that the heat required for vulcanizing rubber can, under various conditions, practically destroy the tissues or fibres of leather, the present invention is especially adapted for joining vulcanized rubber in leather articles and, particularly, the soles of shoes although, as will hereinafter be described, certain phases of the invention may be advantageously used in providing a vulcanized rubber joint between two bodies of rubber.

Referring to Fig. 1, there is illustrated the heel of a shoe consisting of a layer of leather 10, on which are superimposed layers of rubber 11 and 12. The layer of rubber 11 is secured to the layer of leather 10 by a vulcanized rubber joint 13, while a similar joint 13ª is formed between the two layers of rubber 11 and 12. In forming these joints, the surfaces of the heel sections to be joined are channeled, with the channels in each two juxtaposed sections located so as to register with one another, after which the channels in each two members are filled with uncured rubber in which there is embedded a heating element 14. Preferably, this heating element is in the form of an electrical conductor of high electrical resistivity, so that by passing an electric current through the conductor heat can be generated interiorly of the raw rubber to raise the latter to vulcanizing temperature. It will be appreciated that the heat generated in this fashion can be accurately controlled and, hence, only sufficient heat will be generated within the rubber to properly vulcanize the latter. In other words, as soon as the rubber is properly vulcanized, the heating step can be terminated, so that no detrimental effects are produced on the surrounding bodies and, particularly, the leather. In forming the channels in the sections of the heels, it is also preferred to so form them that the rubber, when vulcanized, will be wedged in the respective sections. For instance, the side walls of the channels may be undercut, as illustrated, to produce a dove-tailing effect. In actual practice, this mode of forming a vulcanized rubber joint between the sole portion of a shoe and the upper of the shoe has proven highly advantageous, particularly in the repair of rubber footwear, for instance, rubber boots. In this connection, it might be added that, while only the heel portion of an article of footwear is shown in Fig. 1, it will be understood that the sole proper of a rubber boot can be repaired in the same manner as the layer of rubber 12 is secured to the layer of rubber 11 in the heel illustrated in Fig. 1.

A modified form of the invention is illustrated in Fig. 2 in connection with producing a water-tight seam or joint between a leather sole 15 and the leather upper 16 of a shoe. In accordance with usual shoe manufacturing practices, the lower edge of the upper 16 is turned inwardly but, in accordance with the present invention, there is attached to this inturned portion a tape or covering of rubberized fabric 17. This rubberized tape or fabric preferably covers both surfaces of the inturned portion of the leather upper and may be stitched to the upper as indicated at 18. As in the embodiment of the invention shown in Fig. 1, the sole 15 has an undercut channel 19 extending around the upper surface thereof and, in forming this joint, the channel 19 is filled with uncured rubber 20, in which there is embedded the heating element 14. Thus, the upper surface of the uncured rubber 20 is exposed so that it can be forced into contact with what would otherwise be the exposed surface of the rubberized tape or fabric 17. With the sole and upper positioned against one another in this fashion and with the proper pressure, the uncured rubber is raised to vulcanizing temperature through the medium of the heating element 14 which, as in the previous case, is preferably in the form of an electrical conductor arranged in the coil extending through the uncured rubber or along the channel 19. If desired, a rubber cement may be applied to the surface of the leather upper 16 before the rubberized fabric 17 is sewn thereon but, in any event, when the vulcanizing step has been carried on the proper length of time, a thoroughly water-tight seam or joint will be formed due to the fact that the heat generated in element 14 will effect vulcanization of the rubber in the rubberized fabric 17. It will be understood that the interior construction of the shoe, such as the insole, forms no essential part of the present invention and, hence, this interior portion has been more or less diagrammatically illustrated.

Figs. 3 and 4 illustrate a further embodiment of the invention as practised in providing a leather shoe sole 15 with anti-slipping surfaces. In this instance, the joint is produced by forming a channel in the wearing surface of the sole, the channel preferably having undercut side walls, and filling this channel with a mass of uncured rubber 20, in which the heating element 14 is embedded. By raising the temperature of the uncured rubber to the proper degree of heat through the medium of heating element 14, the rubber is vulcanized, in situ, in the sole. Here, again, heating of the uncured rubber from its interior and the accurate control of the heat so applied will prevent the leather being damaged. Also, attachment of the vulcanized rubber to the sole is enhanced by the dove-tail cross-section of the channel forming a mechanical interlock between the vulcanized rubber inlay and the sole. While a continuous, vulcanized rubber joint or inlay is illustrated, it will be understood that the body of rubber need not be of the particular shape shown, nor continuous.

While it is preferred that a filamentary coiled electrical conductor be used for generating heat interiorly of the raw rubber, it will be understood that this heating element may heat the rubber by conduction. For instance, a metallic filament embedded in the uncured rubber may be heated externally of the body of rubber and the heat units transmitted to the rubber by conduction. In each instance, the heat is applied to the uncured rubber interiorly so that, notwithstanding the fact that the rubber is vulcanized, in situ, the heating step can be accurately controlled to thoroughly vulcanize the rubber without unduly heating the surrounding material which, as before stated, is of importance where the rubber is being vulcanized in a leather body.

What I claim is:

1. The method of forming a water-tight joint between the leather sole and the upper of a shoe, which consists in embedding a strip of uncured rubber around the sole adjacent the edge thereof with an electrical conductor embedded in said rubber, securing a length of rubberized fabric to the upper adjacent the edge thereof, positioning said upper on the sole with said rubberized fabric interposed between the upper and uncured rubber, and passing an electric current through said electrical conductor to subject the rubber and fabric to a vulcanizing temperature.

2. The method of forming a water-tight joint between the leather sole and the upper of a shoe, which consists in embedding a strip of uncured rubber around the sole adjacent the edge thereof, securing rubberized fabric to opposite sides of the edge portion of said upper, positioning said upper on the sole with the rubberized fabric on one side of the upper interposed between the upper and said uncured rubber, and subjecting the rubber and fabric to a vulcanizing temperature.

BYRON V. MITCHELL.